Patented Nov. 13, 1945

2,388,929

UNITED STATES PATENT OFFICE 2,388,929

PREPARATION OF OLEFINIC HYDROCARBONS

Henry O. Mottern, Hillside, N. J., assignor to Standard Oil Development Company, a corporation of Delaware No Drawing. Application December 31, 1941, Serial No. 425,137

5 Claims. (Cl. 260—682)

The present invention relates to the recovery of pure olefins from weak acid liquors as well as the production of pure olefins and the separation of an olefin from a mixture of olefins or from a mixture of olefins and saturated hydrocarbons.

There are many chemical processes in which it is a decided advantage to use a substantially pure olefin unmixed with inert diluents, such as saturated hydrocarbons. For example, in chemical reactions with the gaseous olefins in which pressure is advantageous, the effective pressure is normally the partial pressure of the reactive olefin in the mixture. In such cases, substantially pure olefins permit much lower pressures to be employed and less gas to be compressed than in the case of gas mixtures poor in reactive olefin. Also, in many cases the olefin reaction may be reversible, the proportion of the desired product being dependent upon the concentration of reactive olefin in the mixture. In such cases, the dilution of the olefin with an inert diluent, such as a saturated hydrocarbon, may so affect the yield of the desired reaction product as to render the process unprofitable. Also the desired reaction product may be very volatile, as, for example, ethyl chloride and the like, or the chemical reagent used to react with olefin may be very volatile and carried away by the inert diluent. It is also desirable to have isobutylene free of normal butylenes when the isobutylene is to be polymerized or copolymerized to high molecular weight compounds.

The separation of olefins from saturated hydrocarbons and especially the separation of a particular olefin from a mixture of olefins or a mixture of olefinic hydrocarbons and saturated hydrocarbons by fractional distillation is very difficult, due to the closeness of the boiling points of the various hydrocarbons having the same number of carbon atoms to the molecule.

It has been previously proposed to separate the simple olefins from saturated hydrocarbons by reacting the olefins with various metallic salts with which the olefins form labile combinations and from which the olefin may be regenerated. Certain salts of silver, mercury, and copper have been suggested for this purpose, but in commercial practice the use of such salts was found in most cases to be economically unfeasable.

Commercial processes for isolation of substantially pure olefins from petroleum gases and distillates have consisted of extraction of the hydrocarbon solutions containing the desired olefin with 60-98% acid under a variety of conditions, followed by dilution of the acid extract to 46-83% acid strength on a hydrocarbon-free basis which is then heated or distilled with steam. The heating or steam distillation, at atmospheric pressure, causes regeneration of the desired olefin from its acid solution of sulfuric esters. Such processes operating at atmospheric pressure cause considerable polymerization and sulfonation of the olefin which amounts to about 5-10%.

Furthermore, in the process as utilized for the production of alcohols in which an olefin is absorbed in sulfuric acid of a concentration best adapted for the absorption of the particular olefin to yield an acid extract which is diluted with water to an acid concentration of from 40 to 60% on an alcohol-free basis and then distilled to recover the alcohol as a distillate, the residue from the distillation step is a weak acid commonly designated as slop acid which contains from 0.5% to 5% on a volume basis of unrecovered alcohol. In the ordinary operation of an alcohol plant, this slop acid is then put thru a recovery process in which it is first concentrated, and then oxidized or bleached after which it is in condition for recycle to the alcohol process proper. The acid recovery process contains no provision for the recovery of this residual alcohol so it is therefore lost during the acid recovery step. Since a commercial alcohol plant produces from 3 to 5 million gallons of slop acid per year, it is readily apparent that the loss of alcohol during the acid recovery process is large.

The principal object of this invention is the regeneration of olefins from acid extract, especially weak acid extract, as will be pointed out with more particularly in the description to follow. The olefins thus obtained are to be used as such for whatever purpose to which they are best adapted or to be recycled to an absorption zone for conversion to alcohol.

By the present invention it is proposed to regenerate olefin from acid extracts prepared by the well known extraction method by dilution to 5-40% acid strength on a hydrocarbon-free basis followed by heating under superatmospheric pressure at a higher temperature than is possible for such acid strengths at atmospheric pressure. Such a process is operated at acid strengths which yield no polymer or sulfonated material at the temperature of regeneration and thereby increases the yield of olefin from 90-95% to 98-99%. An added advantage of the process is that the acid is not fouled with organic material which produces a poor quality of acid for extraction after restoration.

According to the present invention, olefinic hydrocarbons are prepared from their corresponding alkyl sulfuric, phosphoric acid esters or alcohols by heating a dilute aqueous solution of such sulfuric or phosphoric acid esters to high temperatures under pressures developed at the temperatures used. The olefinic material is recovered from the reaction mixture by fractional distillation under pressure.

The formation of olefins from acid extracts is based upon an equilibrium reaction which in turn is a function of the conditions of temperature, acid strength and time of reaction. The conditions of generation included in this invention are chosen to eliminate the conditions of temperature and acid strength which cause the formation of olefin polymer and sulfonated olefins. By reducing the acid strength, polymerization and sulfonation are reduced, but unless the temperature is increased, the major products will be alcohol rather than olefin. In order to minimize the formation of alcohol, the temperature is greatly increased and the reaction mixture held under pressure until the desired temperature and equilibrium conditions have been reached. This required from ½ to 3 hours, generally about 1 hour.

When acidic extracts of olefinic esters are used for the preparation of olefins, the extract is diluted with water to an acid concentration of from 5 to 40% on an alcohol-free basis. The dilute extract is then fed to a pressure reaction vessel where it is heated to from 100° F. to 400° F. under a pressure of from 20 to 150 lbs./sq. in. The olefin produced is fractionated from the reaction mixture under a pressure equal to that maintained within the reaction vessel. Some alcohol is taken overhead with the olefin and after separation from the olefin, is either returned to the reaction mixture or to the diluted extract. After the olefin has been removed, the acid is drawn from the reaction mixture and concentrated for further olefin absorption. Considerable water is removed from the dilute acid by flashing at atmospheric or subatmospheric pressure since the acid is heated above the boiling point of water at the pressure of olefin regeneration.

The invention is particularly applicable to the isolation of olefinic hydrocarbons from low boiling fractions of petroleum distillates. Such petroleum distillates, normally segregated into fractions containing predominantly $C_3$, $C_4$, $C_5$, and up to $C_{10}$ carbon atoms to the molecule, are extracted with 60–95% sulfuric acid or 60–85% phosphoric acid by well known methods. The acid extracts so obtained, after separation from the residual saturated hydrocarbons, are diluted to 5–40% acid strength, on an alcohol-free basis. The dilute acid extract is then heated under pressure in a reactor, suitable for the treatment of corrosive acid solutions under such conditions, for the recovery of olefin. Both secondary and tertiary olefins can be regenerated by the method of this invention, and if desired, the method of this invention can be utilized to isolate tertiary olefins from acid extracts containing the acid esters of both tertiary and secondary olefins. Tertiary olefins require a higher dilution of the acid extract and lower reaction temperature than do secondary olefins. For the recovery of tertiary olefins the acid extract should be diluted to from 5–20%, preferably about 10% acid concentration on an alcohol-free basis and the regeneration of the olefin should be conducted at a temperature of from 100° F.–250° F., usually about 200° F. under the pressure attained at these temperatures. Secondary olefins require higher acid concentrations and reaction temperatures than do the tertiary olefins. Where it is desired to recover tertiary olefins to the exclusion of secondary olefins, the acid extract is diluted to the acid concentration best adapted to the recovery of tertiary olefins and the dilute acid solution is heated to 100° F.–150° F., taking the tertiary olefin off overhead under pressure. After all of the tertiary olefin has been recovered, the acid strength of the solution is increased either by adding acid or by evaporation of the water and the temperature is then raised to from 150° F. to 400° F., usually about 300° F., and the secondary olefin taken off under pressure.

The method of this invention can also be employed for the production of olefins from their corresponding alcohols by either a batch or continuous method although it is preferred to use the continuous method. To produce olefins continuously the dilute acid solution is heated in a pressure vessel to the desired temperature. Alcohol is injected into the dilute acid solution which is adjusted to best accommodate the type of olefin to be regenerated. As olefin is formed it is fractionated from the pressure vessel under pressure and any unchanged alcohol coming over is returned to the reaction mixture. Acid is withdrawn as the concentration falls below that required for best operation and the water flashed off under atmospheric pressure, the acid then being returned to the pressure vessel. Sufficient water should be removed from the acid to at least reinstate it to its original acid concentration. The concentration of alcohol in the reaction mixture may vary between .5% and 50%.

The invention is very well illustrated by a typical run on a plant slop acid containing 0.5 volume percent of alcohol. This slop acid was recovered as a residue after steam stripping secondary butyl alcohol from an acid extract. A quantity of the slop acid was diluted to 40% acid concentration on an alcohol-free basis. 28.25 liters of this 40% solution was heated in a pressure vessel to 300° F. under 80 lbs./sq. in. pressure. Secondary butylene was taken overhead. After approximately 90 minutes the formation of secondary butylene ceased. 1.25 cu. ft. of secondary butylene was recovered which is equivalent to a 99% yield of the alcohol in the weak acid solution.

What is claimed is:

1. The method of recovering olefins from alcohol-acid extracts which comprises diluting the acid extract with water to an acid concentration of from 5 to 40% on an alcohol-free basis, heating the diluted extract in a reaction vessel to a temperature of from 100° F. to 400° F. under pressures ranging from 20 to 150 lbs./sq. in. for a time sufficient to form olefin and removing olefin at the pressure maintained within the reaction vessel.

2. The method of recovering tertiary olefins from an acid extract of tertiary olefins which comprises diluting the acid extract with water to an acid concentration of from 5 to 20% on an alcohol-free basis, heating the diluted extract in a reaction vessel to a temperature of from 100° F. to 250° F. under the pressure ranging from 20 to 150 pounds per square inch generated at the temperature obtained within the reaction vessel, for a time sufficient to form tertiary olefins and removing the tertiary olefins at the pressure maintained within the reaction vessel.

3. The method of recovering secondary olefins from acid extracts of secondary olefins which comprises diluting the acid extract with water to an acid concentration of from 20 to 40% on an alcohol-free basis, heating the diluted extract in a reaction vessel to a temperature of from 150° F. to 400° F. under pressures ranging from 20 to 150 pounds per square inch generated at the temperature obtained within the reaction vessel, for a time sufficient to form secondary olefins and removing secondary olefins at the pressure maintained within the reaction vessel.

4. The method of recovering secondary butylene from acid extracts of secondary butylene which comprises diluting the acid extract with water to an acid concentration of 40% on an alcohol-free basis, heating the diluted extract in a reaction vessel to a temperature of 300° F. under 80 lbs./sq. in. pressure and removing secondary butylene as formed.

5. Process of segregating tertiary olefins from a mixture of secondary and tertiary olefins present in an acid extract of secondary and tertiary olefins which comprises diluting the acid extract to an acid concentration of about 10% on an alcohol-free basis, heating the diluted extract to a temperature of from 100° F. to 150° F. under the pressure ranging from 20 to 150 pounds per square inch generated at these temperatures and removing tertiary olefins as formed.

HENRY O. MOTTERN.